United States Patent [19]

Brinzey

[11] Patent Number: 5,041,471

[45] Date of Patent: Aug. 20, 1991

[54] FRICTION MATERIALS WITH UNIVERSAL CORE OF NON-ASBESTOS FIBERS

[75] Inventor: Arpad E. Brinzey, Charlotte, N.C.

[73] Assignee: Braketech, Incorporated, Charlotte, N.C.

[21] Appl. No.: 604,999

[22] Filed: Oct. 29, 1990

Related U.S. Application Data

[63] Continuation of Ser. No. 315,858, Feb. 27, 1989, abandoned.

[51] Int. Cl.$^5$ ................................................. C08J 5/14
[52] U.S. Cl. .................................... 523/153; 523/155; 523/156
[58] Field of Search ....................... 523/153, 155, 156

[56] References Cited

U.S. PATENT DOCUMENTS

| | | | |
|---|---|---|---|
| 4,145,223 | 3/1979 | Iwata | 523/153 |
| 4,373,038 | 2/1983 | Moraw et al. | 523/156 |
| 4,374,211 | 2/1983 | Gallagher et al. | 523/153 |
| 4,386,168 | 5/1983 | Fujimaki et al. | 523/155 |
| 4,717,764 | 1/1988 | Ward | 528/340 |
| 4,775,705 | 10/1988 | Parker et al. | 523/155 |

*Primary Examiner*—Lewis T. Jacobs
*Attorney, Agent, or Firm*—Timothy R. Kroboth

[57] ABSTRACT

A non-asbestos friction material has a core group of fibers that is universally used in a plurality of friction material formulations to provide appropriate friction materials for different end uses. The universal core group is resistant to temperatures above 1000° F. Friction materials made with the core group have the additional advantage of long wear. Polybenzimidazole (PBI) is an essential element of the core group of fibers because its friction level increases as the temperature increase. The other elements of the core group are aramid fibers, carbon fibers, and a high strength ceramic fiber.

6 Claims, 5 Drawing Sheets

FRICTION MATERIALS WITH UNIVERSAL CORE OF NON-ASBESTOS FIBERS

This application is a continuation of application Ser. No. 315,858, filed Feb. 27, 1989, now abandoned.

FIELD OF THE INVENTION

This invention relates to non-asbestos friction materials for vehicles and machinery.

BACKGROUND OF THE INVENTION

For many years asbestos fibers were the preferred principal ingredient in high performance friction materials. Asbestos is not only plentiful and inexpensive but, more importantly, it possesses the properties known to be desirable for effective braking. Specifically, asbestos has varying fiber length, porosity, compactability, excellent fibrillation, and good thermal qualities. The asbestos mix for friction materials generally comprised 70% asbestos and only 30% fillers, such as chalk, rubber, and limestone.

Unfortunately, asbestos is now regarded as a carcinogen and is not generally utilized in the United States for the manufacture of friction materials. A variety of materials have been and are being used in place of asbestos in friction materials, including aramids, glass wool, steel wool and fibers, ceramic fibers, and carbon fibers.

Due to the relatively high cost of man-made fibers used as alternatives to asbestos, current friction materials have only 1 to 15% of the man-made alternatives to asbestos and between 85% to 99% fillers.

Almost all brake friction materials have these component materials: (1) fibers, (2) fillers, (3) binding resins, (4) friction particles, and (5) friction modifiers.

These components are used in three different types of brake friction materials which are generally known as (1) organic, (2) semi-metallic, and (3) metallic friction materials. The components of these three types of friction materials are shown below:

| Example A | | | |
|---|---|---|---|
| | ORGANIC | SEMI-METALLIC | METALLIC |
| FIBERS | asbestos and/or glass fibers; cotton | aramids and/or glass fibers; carbon; ceramic | steel wool and/or carbon; ceramic |
| FILLERS | chalk and/or limestone; rubber; baryte calcines | barium sulfates and/or cashew particles; iron powders | barium sulfates and/or iron powders |
| BINDERS | phenolic or cashew modified phenolics | phenolic or cashew modified phenolics | phenolics |
| FRICTION PARTICLES | alumina | silicates; oxides; brass; copper | iron powders; oxides; silicates |
| FRICTION MODIFIERS | antimony and/or graphite | oxides; zinc; brass; copper graphites; rubber | oxides; graphites |

The end uses of the three different types of brake friction materials are summarized in Example B:

| Example B | |
|---|---|
| END USES | BRAKE FRICTION MATERIALS |
| Passenger cars: | Organic; Non-metallic; Semi-metallic; and Metallic. |
| Racing Cars*: | Organic (asbestos); and Metallic. |
| Industrial: | Organic and Inorganic (asbestos and Non-asbestos). |
| Heavy Duty: (Trucks and Off-road vehicles; Military) | Semi-metallic and Metallic. |
| Aircraft: | Sintered metallic; Carbon/carbon fiber; Semi-metallic. |

*Some racing cars use carbon/carbon fiber and sintered composites.

High performance brakes as used in racing cars, for example, need to tolerate sustained high temperatures, and use metallic fibers, whereas lower performance brakes as used, for example, in industrial applications use semi-metallic materials such as aramid fibers for longer wear. Aramid fibers are known to promote improved wear.

In the United States, manufacturers of race car brakes are still relying on asbestos-containing materials. With the exception of the carbon/carbon fiber materials, the United States has not started producing non-asbestos friction materials for racing until very recently, and with only a limited degree of success.

In addition to the health stigma, asbestos has the disadvantage of causing high wear on rubbing surfaces, especially under racing conditions. There exists a need for viable alternatives to asbestos.

Efforts to find a satisfactory replacement for asbestos are illustrated in the following patents:

| PATENT NO. | ISSUE DATE | INVENTOR | TITLE |
|---|---|---|---|
| 4,145,223 | Mar. 20, 1979 | Iwata | FRICTIONAL MATERIAL FOR BRAKES |
| 4,374,211 | Feb. 15, 1983 | Gallagher | ARAMID CONTAINING FRICTION MATERIALS |
| 4,476,256 | Oct. 9, 1984 | Hamermesh | FRICTION MATERIAL FOR BRAKE LININGS AND THE LIKE |
| 4,656,203 | Apr. 7, 1987 | Parker | FRICTION MATERIALS AND THEIR MANUFACTURE |
| 4,722,949 | Feb. 2, 1988 | Horiguchi | NON-ASBESTOS FRICTION COMPOSITION CAPABLE OF MANUFACTURE IN DRY PROCESS |

The newer metallic materials, such as disclosed in Iwata, Hamermesh, and Parker are not considered adequate in racing applications because these materials generate very high heat under sustained heavy braking and this causes premature material oxidation and consequent disintegration of the friction material.

Gallagher substitutes aramid polymer pulp fiber, a fibrous reinforcing material, and a resinous binder for asbestos and metallic fibers, but the aramid fibers are not effective in racing car brakes and other high performance applications where the friction material is subjected to sustained high friction and temperatures in excess of 1,000° F.

SUMMARY OF THE INVENTION

It is a primary object of the invention to provide a universal core group of friction materials that can be used with other friction material components to provide a variety of formulations for friction materials with different friction levels, including specifically friction materials for race cars, military applications, automobiles, and machinery.

It is a further object of this invention to provide a universal core group of friction materials that can be combined with other friction materials for specific uses to provide improved braking with a longer useful life than has heretofore been possible.

It is another object of the invention to provide a friction material which will maintain a high char yield and thus maintain longer life integrity under extreme operating temperatures than has heretofore been possible.

It is a further object of the invention to provide a friction material which will cause minimum wear on the rubbing surfaces.

A still further object of the invention is to provide a universal core group of elemental materials that can be used with other friction material components to produce an engineered friction material that will not produce high or low noise frequencies.

BRIEF DESCRIPTION OF THE DRAWINGS

Some of the objects of the invention having been stated, other objects will appear to those skilled in the art from the following description, when considered in connection with the accompanying drawings, in which.

DETAILED DESCRIPTION OF THE INVENTION

Figure 1:
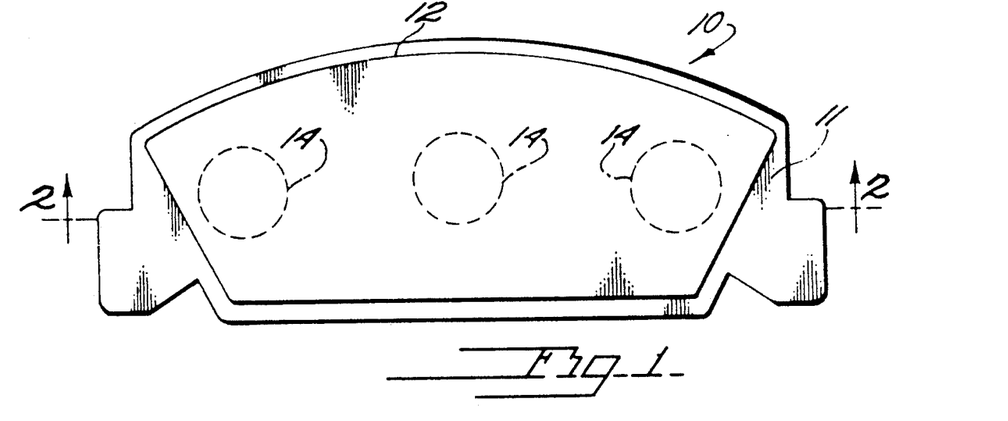
FIG. 1 is a top view of a brake pad.
Figure 2:
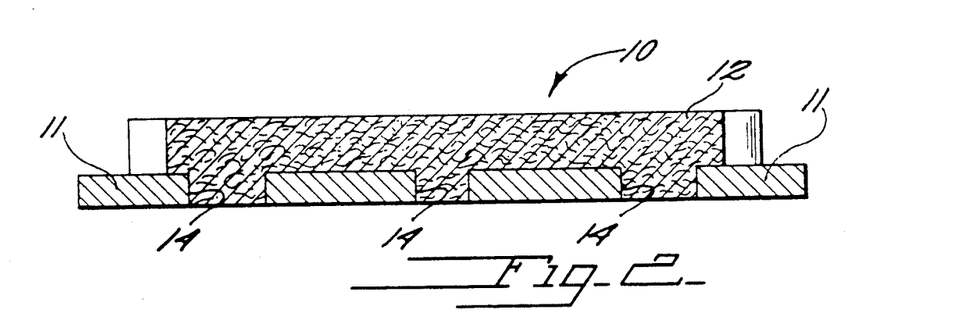
FIG. 2 is a sectional view taken substantially along the line 2—2 in FIG. 1.
Figure 3:
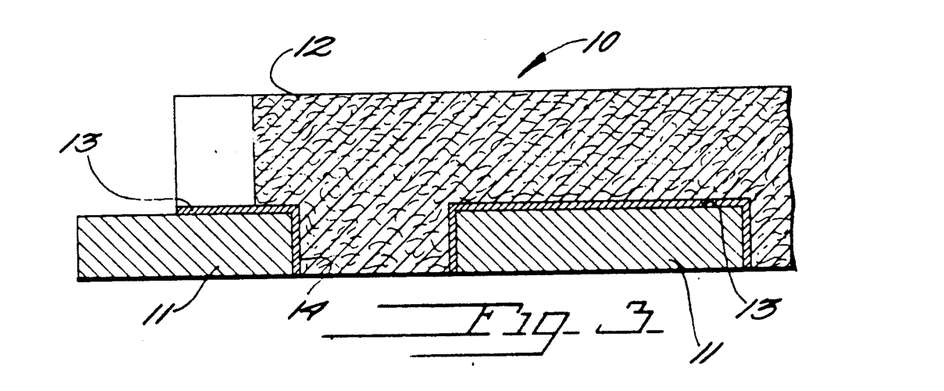
FIG. 3 is an enlarged sectional view of the brake pad, similar to FIG. 2, with parts broken away.

Referring more specifically to the drawings, the numeral 10 broadly designates a brake pad comprising a metal backing plate 11 and a quantity of friction material 12 molded to the backing plate 11 under pressure, temperature, and a thermosetting adhesive 13. Bleed holes 14 are provided in the metal plate 11 and filled by the friction material 12 to permit degassing of the friction material during manufacture.

The friction material 12 is represented in the drawings as a generic composition of materials consisting of a variety of fibers, fillers, and binders as is well known in the art. The subject of this invention is a universal core group of fibers comprising specific fibers for use with other fibers to effectively produce different friction materials for different end uses. The universal core group of fibers effectively serves the utilitarian functions of asbestos and has the additional advantage of not producing the high wear on rubbing surfaces caused by asbestos.

Heretofore, brake manufacturers created a good product that was inexpensive by using the plentiful and inexpensive asbestos as the main ingredient for friction materials. Now, with the phasing out of asbestos friction material, producers are laboring to produce non-asbestos friction materials with more expensive replacement materials, while keeping prices near the relatively low price of asbestos friction materials.

All known non-asbestos friction materials use a disproportionately large percentage of relatively inexpensive and ineffective fillers (85-99%) to the more expensive and more effective asbestos-replacement fibers (1-15%). The existing non-asbestos friction materials are suitable for low performance applications, but not for high performance applications.

According to the invention, effective friction materials for all levels of performance are provided by using a universal core group of four (4) fibers to effectively replace the asbestos in different friction material formulations for different end uses. The four fibers in this universal core group mix together intimately during manufacture and produce a well fibrilated open mass comprising 41% by weight of the total mix. The remaining components of any one of several different formulations thoroughly mix with each other and with the fibers in the core group to form a homogenuous friction material which is effective for its intended use.

The four fibers in the universal core group and a range of their percentages by weight in different friction material formulations are set forth below:

| Example C THE UNIVERSAL CORE GROUP | |
| --- | --- |
| Fiber | Percentage by Weight |
| KEVLAR 29[1] aramid fiber pulp | 1-10% |
| Carbon Fiber (⅛" or ¼" staple) | 1-18% |
| FIBERFRAX HSA[2] ceramic fiber | 5-15% |
| PBI[3] polybenzimidazole fiber (⅛" or ¼" staple) | 2-20% |

[1] KEVLAR is a registered trademark of E.I. DuPont DeNemours & Company.
[2] FIBERFRAX HSA is a registered trademark of Standard Oil Materials Company.
[3] PBI is a registered trademark of Hoescht Celanese Corporation.

In practice, the fibers making up the core group are mixed as in a Patterson/Kelly dry mixing machine, and then the resin, friction particles, friction modifiers, and fillers are added in different ratios to make an appropriate friction material for a desired end use.

A percentage of PBI fibers significantly less than 2% by weight is of no significant benefit in any friction material formulation. Use of significantly more than 20% by weight of PBI fibers tends to cause uneven mixing and clumping of the PBI fibers.

Test samples have been made to illustrate the three preferred embodiments of this invention. After each of the samples was mixed, a sample brake pad was made using a 3½"×5" mold and hot pressed at a pressure of 60 tons and a temperature of 180° C. for 30 minutes with three bump cycles, allowing flow and cure of the bonding resin. All sample brake pads were molded under the same molding parameters.

A 1"×1" square was cut from the left portion of the center of each block, and a Chase test (SAE J661a) was performed. Test samples of the three preferred embodiments were made with the percentages of materials shown in Example D.

| Example D | | | |
|---|---|---|---|
| | EMBODIMENT 1 | EMBODIMENT 2 | EMBODIMENT 3 |
| | (Percentages By Weight) | | |
| UNIVERSAL CORE FIBERS | | | |
| KEVLAR aramid fibers | 3 | 3 | 3 |
| Carbon Fibers | 18 | 18 | 18 |
| FIBERFRAX HSA ceramic fibers | 10 | 10 | 10 |
| Polybenzinidazole (PBI) fibers | 10 | 10 | 10 |
| Total Universal Core Fibers | 41% | 41% | 41% |
| OTHER INGREDIENTS | | | |
| Resin | 10 | 10 | 10 |
| Friction Particles | 39 | 30 | 39 |
| Friction Modifiers and Fillers | 10 | 19 | 10 |
| TOTAL | 100% | 100% | 100% |

The friction particles in Embodiment 1 are copper, brass, bronze/tin metals, aluminum oxide and iron oxide.

Embodiment 2 has the same friction particles as Embodiment 1, but with a lower percentage of oxides and a correspondingly higher percentage of antimony, a lubricant.

In Embodiment 3, the majority of the friction particles were iron sponge and powder instead of the corelative amounts of brass and copper in Embodiment 1.

Three different sample embodiments were made, all containing 41% of the universal core group of fibers in order to evaluate friction level and wear of the sample brake pads. Variances were made in the friction particles and friction modifiers and fillers for the purpose of testing the friction level and wear of brakes under sustained loads and temperatures.

A fourth sample was made like Embodiment 3, except that the PBI fiber was omitted, and replaced by an anhydrous short whisker fiber, which is widely known as a standard snow white filler. This fourth sample was made to illustrate the conversion properties of polybenzinidazole (PBI) above 1,000° F., and to illustrate that PBI is a unique high temperature binding fiber.

Figure 7:
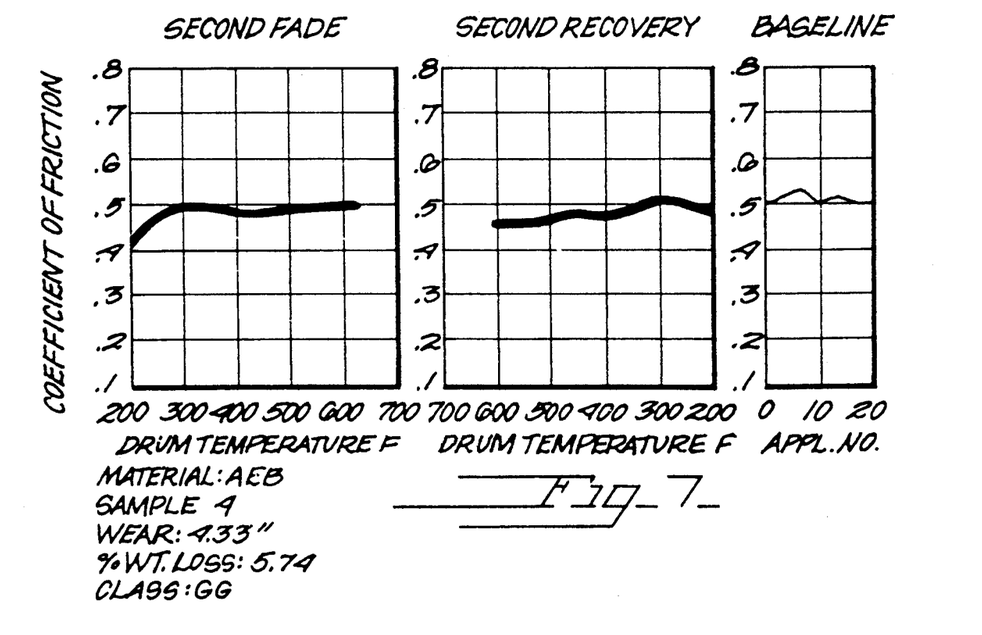

The standard SAE J661a test graph of the fourth sample (without the PBI fibers) is shown in FIG. 7. As the brake is applied, heat is generated due to friction. A sustained heavy load will tend to cause the brake material to overheat, which results in degradation of the binder fibers (KEVLAR aramid fibers and carbon fibers), which diminishes the structural integrity of the product.

The relative effects of heat and abuse on the pads made of Embodiment 3 and Sample 4 are readily apparent from even a casual inspection of the pads after the tests. The pad of Embodiment 3 is virtually unscathed, while the pad of Sample 4 is cracked, distorted, glazed, and unevenly worn.

Comparative SAE J661a tests were made to evaluate the compositions of Embodiments 1, 2, and 3 with several widely accepted high performance brake compositions.

Figure 9:
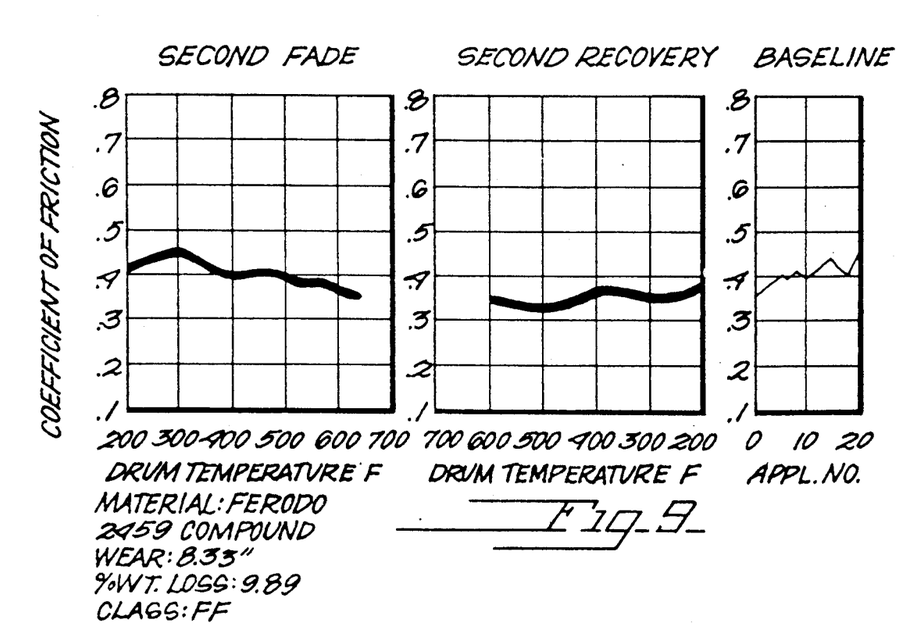

FIG. 9 shows the test results of a brake composition marketed under the brand name of FERODO 2459 as a world class racing friction material.

Figure 10:
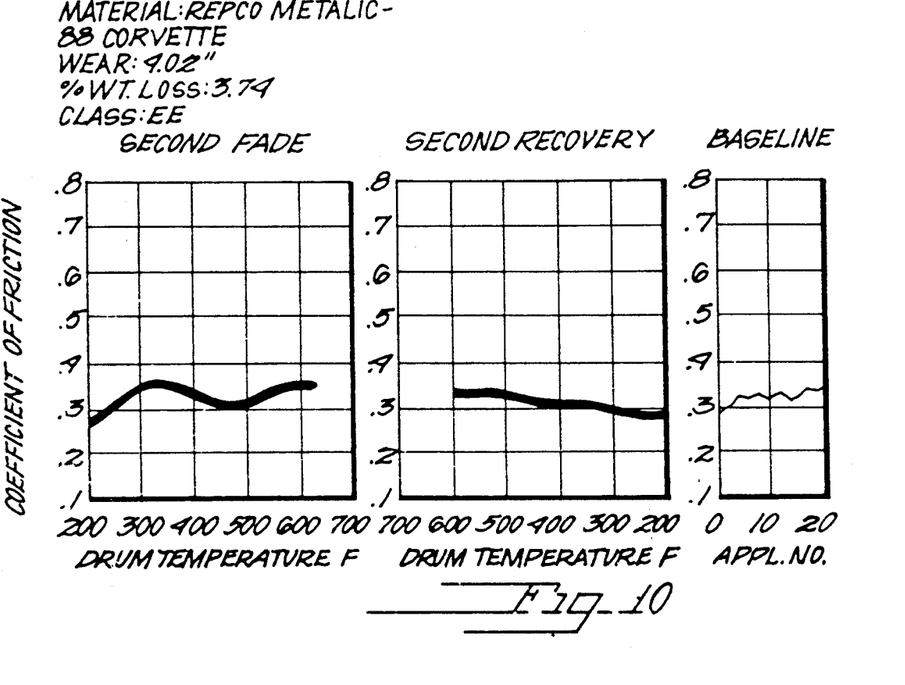

FIG. 10 shows the test results of a high performance brake composition marketed under the brand name of REPCO, and currently used in the late model Corvette automobiles.

Figure 11:
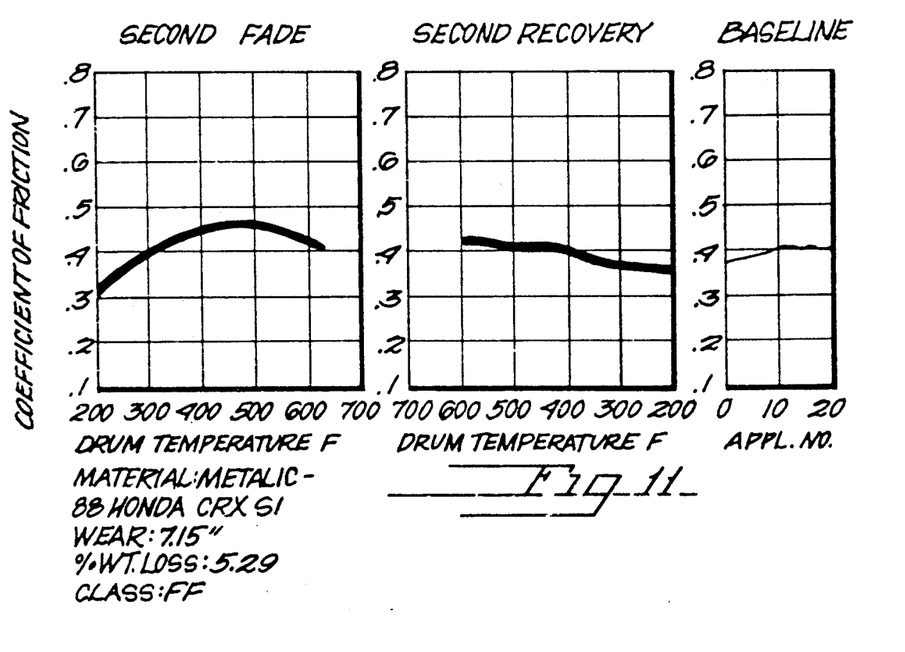

FIG. 11 is the test result of a Japanese made friction material currently used in the late model Honda CRX SI.

A comparison of the test results for Embodiments 1, 2, and 3 with the test results of FIGS. 9, 10, and 11 appears in Example E.

| Example E | | | | |
|---|---|---|---|---|
| | WEAR (Inches) | PERCENT OF WEIGHT LOSS | FRICTION CLASS | APPLICATION |
| Embodiment 1 | 0.0000 | 2.90 | FF | High Performance & General Automotive |
| Embodiment 2 | 0.0000 | 2.25 | EE | General Automotive and Industrial |
| Embodiment 3 | 2.40 | 6.03 | GG | Racing |
| FERODO 2459 (Example H) | 8.33 | 9.89 | FF | Racing |
| REPCO brake (Example I) | 4.02 | 3.74 | EE | High Performance |
| Honda brake (Example J) | 7.15 | 5.29 | FF | General Automotive |

Figure 4:
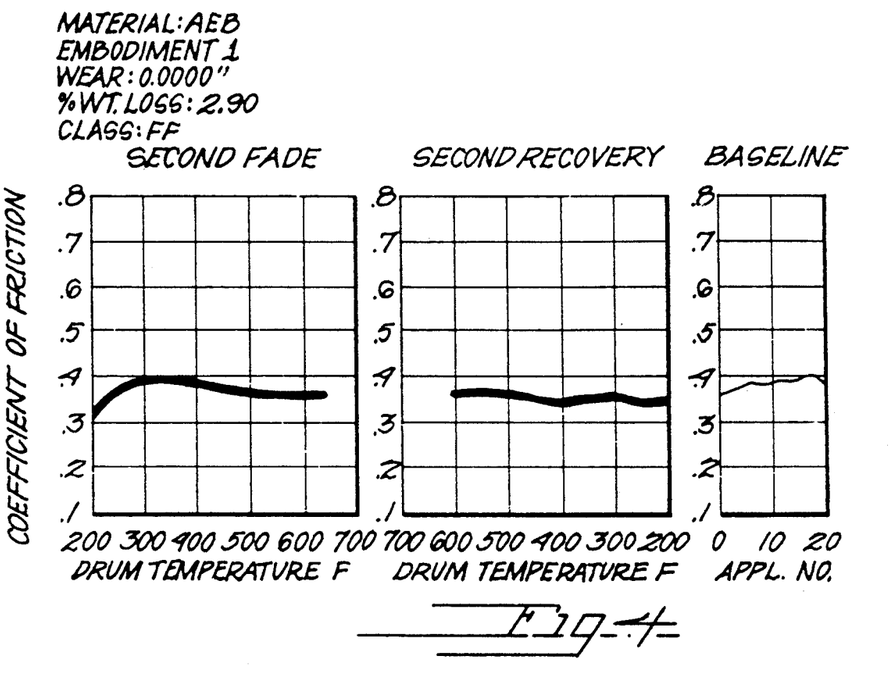
FIGS. 4-11 are graphs illustrating the results of tests on friction materials.
Figure 5:
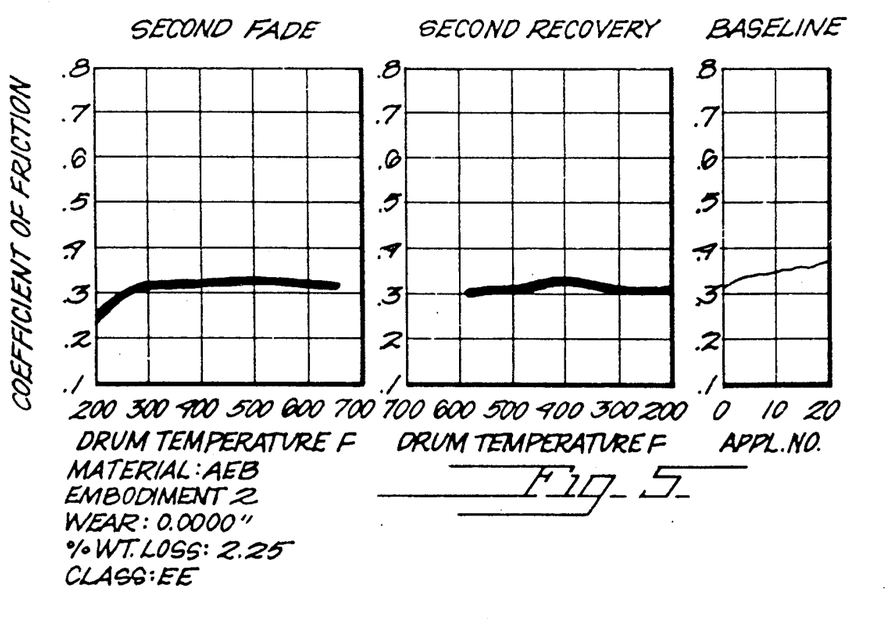
Figure 6:
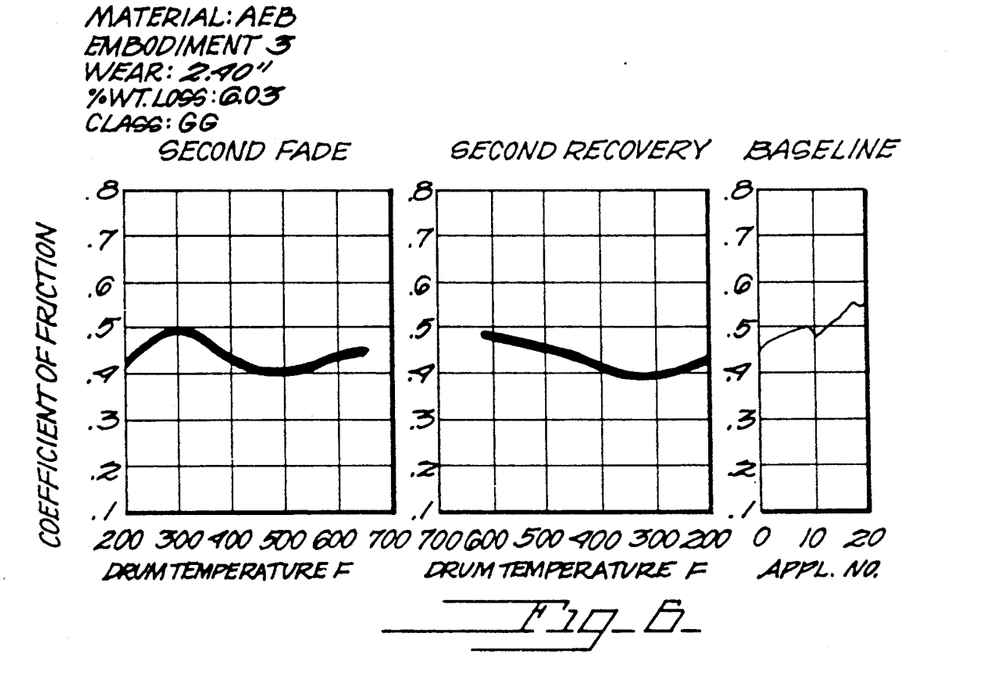

The three preferred embodiments of the invention and the fourth sample were all tested with the standard SAE J661a Brake Lining Test. The test results are shown in FIGS. 4, 5, and 6.

The friction material of Embodiment 1 (FIG. 4) was engineered for a medium size automobile.

The friction material of Embodiment 2 (FIG. 5) was engineered for a light weight automobile, or machinery.

The friction material of Embodiment 3 (FIG. 6) was engineered for heavy duty applications, such as racing cars and off-road vehicles.

In all three Embodiments, the braking quality improves with use because the brake material vaporizes and deposits the oxidized ingredients into the pores of the rubbing surfaces. This results in more compatibility of the rubbing and brake surfaces.

Note in Example E that the friction level of Embodiment 3 is significantly higher than the friction level of Embodiment 1 (GG for Embodiment 3 and FF for Embodiment 1). The higher friction level of Embodiment 3 enables the use of substantially less pedal pressure to reach the braking threshold with ease at any speed.

The brakes of both embodiments worked equally well when cold, hot, and very hot. There was no fade of any kind, but there was a noticeable difference in the pedal pressure needed to complete the high-speed stops.

Specifically, when using the pads of Embodiment 1, the brake pedal had to be pressed progressively harder in order to induce shorter stopping distances. The friction level remained very even as the temperature increased (no fade).

Using the brake pads of Embodiment 3, the vehicle progressively stopped more quickly with a uniform pedal pressure because the friction increased as the temperature increased. Braking power remained very strong even at rotor temperatures in excess of 1500° F.

Neither one of the embodiments created any detrimental marring of the disc surfaces despite the fact that rotors (during both tests) glowed with heat.

The standard SAE J661a Brake Lining Test was performed on additional compositions containing all four of the elemental fibers in the core group. These tests demonstrate the effectiveness and advantage of the combination of KEVLAR aramid pulp, FIBERFRAX HSA ceramic fibers, PBI fibers, and carbon fibers in the core group.

Figure 8:
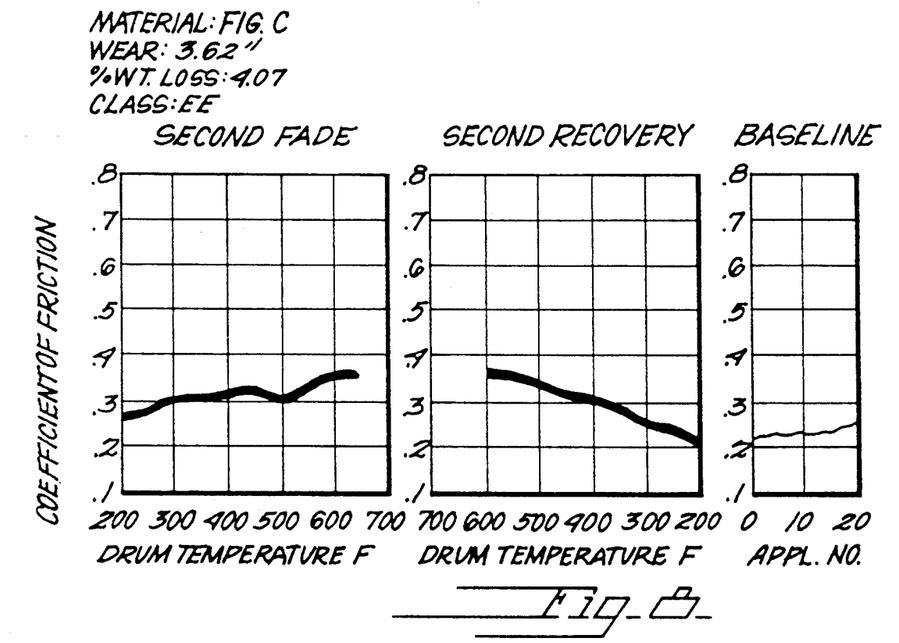

FIG. 8 shows the test results on a formulation using PBI fibers as 60% of the mass, the remainder comprising 15% phenolic resin and 25% fillers. The test shows an increase in friction levels of the PBI fibers as the temperature approaches 650° F. Friction produces heat which oxidizes the PBI fibers beginning at 650° F. The PBI fibers convert to pitch carbon fibers (carbonization) at 1,000° F. and take on the desirable frictional properties of carbon fibers.

PBI is chemically stable and will not burn in air. PBI will not melt and retains a high char yield. PBI has high thermal shock tolerance. PBI retains dimensional stability at very high temperatures.

PBI fibers when cut into $\frac{1}{4}''$ or $\frac{1}{8}''$ staple serves a very important function in the preferred embodiments. Because PBI does not fibrilate, these PBI fibers when mixed with the opened KEVLAR aramid fibers, carbon fibers, and FIBERFRAX HSA ceramic fibers, will intermingle and intertwine with the other components. Because PBI fibers are relatively stiffer than the accompanying fibers, a random PBI fiber will occur in a polylinear orientation. This unique fiber behavior helps hold the mix together, allowing efficacious pre-forming because green (uncured) strength is increased.

In a pressed and cured environment, the PBI fibers act as the reinforcing material that will hold the structure together at all operating temperatures.

The core fibers in Embodiments 1, 2, and 3 are much more expensive than asbestos. In addition, neither of the man-made fibers, singly, are adequate to engineer a high performance friction material (with the exception of carbon/carbon fiber composites at a very high price.

Even the two stronger fibers, KEVLAR aramid fibers and carbon fibers have distinct disadvantages such as carbonization with resulting low char yields causing accelerated material dehydration and degradation. Aramid and carbon crumble when carbonized. PBI converts into carbon but does not decompose.

KEVLAR aramid fibers fibrilate the best among the man-made fibers, and increases flexural strength both during and after manufacture. See Gallagher U.S. Pat. No. 4,374,211. KEVLAR fibers are the most universally used product in dry mixing procedures. In dry mixing techniques, orientation of man-made fibers during mixing is critical. KEVLAR aramid pulp and short fibers of KEVLAR aramid behave better while being mixed, but as a material, tend to carbonize at low temperatures. The PBI fibers are an essential element of the core group to withstand the heat and preserve structural integrity in high performance applications, such as racing.

Friction performance and wear resistance is enhanced by materials containing carbon fibers. In addition, carbon fibers contribute greatly in fade resistance at temperatures near 600° F. Carbon fibers have very high tensile strength, but tend to pulverize during mixing.

The role of the PBI fiber becomes evident in the case of Embodiment 3 by exhibiting a rising curve in the coefficient of friction above 600° F. When KEVLAR aramid fibers and carbon fibers start to carbonize due to oxidation, the PBI fibers will be nearing conversion temperature into carbon fibers. The FIBERFRAX HSA ceramic is of a very clean variety and thus minimizes abrasive tendencies. FIBERFRAX HSA ceramic fibers exhibit excellent high temperature stability, superior retention of physical form at temperature extremes, and create an excellent thermal shock protection while reducing fade. Because of its short fiber length and ease in mixing, FIBERFRAX HSA ceramic mixes well with the other core ingredients of the three preferred embodiments.

The Chase test (Standard Automotive Engineer Test SAE J661a) is a procedure in which friction materials can be tested under laboratory conditions. This test provides accepted and reliable data, whereby the formulator can determine the closeness of fit of the engineered friction material, but the data obtained from the tests are not always an indication of the performance level of a friction material in brakes operated under actual conditions.

Therefore, to obtain further relevant data, test batches of Embodiments 1 and 3 were made and manufactured into finished brake pads and used in actual road tests. The brake pads of both of these embodiments were made to fit a 1988 Accura Integra equipped with 4 wheel disc brakes. The vehicle weight was about 3500 pounds, including fuel and a 220 pound driver.

The following tests were performed:

TEST I

Test I was performed with brake pads made from the composition of Embodiment 1.

Pads and rotors were measured before installation and the vehicle was driven for 8 miles while applying light pressure to the brakes to allow burnishing of the pads.

To create an accelerated gas-out of the pads, the vehicle was accelerated to 100 mph and hard pressure applied to the brakes until full stop. The brakes were allowed to cool for half an hour to about 220° F. This procedure was followed by driving normally on public streets for 100 miles.

The vehicle was then taken to a racetrack and speeds in excess of 100 mph were reached, followed by hard braking to repeated complete stops by applying enough pressure to the brakes to bring the tires to the threshold of wheel-lock. This procedure was repeated for 63 miles without allowing the brakes to completely cool. An Atkins digital meter was installed on board to measure rotor heat.

Following the 63 mile test, the brakes were inspected for wear, signs of physical degradation and deformation. The measurable data appears in Example F.

|  | Example F | | |
|---|---|---|---|
|  | BEFORE TEST (Inches) | AFTER TEST (Inches) | TOTAL WEAR (Inches) |
| ROTOR THICKNESS[2] | 0.8057 | 0.8057 | None |
| Front Pad - Inside (Left side) | 0.10007 | 0.10004 | 0.00003 |
| Front Pad - Outside (Left side) | 0.09999 | 0.09997 | 0.00002 |
| Front Pad - Inside (Right side) | 0.10009 | 0.10005 | 0.00004 |
| Front Pad - Outside (Right side) | 0.10008 | 0.10005 | 0.00003 |

[2] The thicknesses were measured at 4 points around their circumference and the 4 measurements were then averaged.

Rotor temperatures were observed to be 615° F. at the initial hard braking stop, and 1150° F. during the ensuing repeated hard stops. There was no unusual pad wear, no cracks, and no undue scoring or undue degradation of the friction material.

TEST II

Following Test I, a similar test was performed using the same vehicle with Embodiment 3. Both the burnishing and gas-out were performed as in Test I. The vehicle was driven for a total of 440 miles on city and county highways, attempting to make all stops as harshly as possible. Numerous full stops from speeds in excess of 100 mph were included in the test. The measurable data from Test II appears in Example G:

|  | Example G | | |
|---|---|---|---|
|  | BEFORE TEST (Inches) | AFTER TEST (Inches) | TOTAL WEAR (Inches) |
| ROTOR THICKNESS[2] | 0.8057 | 0.80428 | 0.0014 |
| Front Pad - (Inside) | 0.4700 | 0.4633 | 0.0067 |
| Front Pad - (Outside) | 0.4901 | 0.4820 | 0.0081 |

Note: Rotors were measured at 4 locations around their circumference and the measurements were averaged. The pads were measured at the middle and extreme left and right and averaged. Only the front left brake assembly was measured.

Again, there was no unusual pad wear, no cracks, and no undue scoring or undue degradation of the friction material.

TEST III

An additional test was performed using the friction material of Embodiment 3, but with different brake pads mounted on a 1988 Honda CRX SI. This vehicle was custom prepared to be used in Sports Car Club of America (SCCA) Solo One Racing, and in International Motor Sport Association (IMSA) Street Stock road racing.

In this test, the car was driven very hard for 422 miles while simulating racing conditions when applying the brakes.

The measurable data from Test III appears in Example H:

|  | Example H | | |
|---|---|---|---|
|  | BEFORE TEST (Inches) | AFTER TEST (Inches) | TOTAL WEAR (Inches) |
| LEFT ROTOR THICKNESS[2] | 0.7478 | 0.7470 | 0.0008 |
| Left Front Pads (Inner) | 0.572 | 0.57067 | 0.00133 |
| Left Front Pads (Outer) | 0.572 | 0.57066 | 0.00134 |

Note: Rotors were measured at 4 locations around their circumference and the measurements were averaged. The pads were measured at 3 locations (center and extreme left and right, and then averaged.

Inspection of the pad after the test showed the excellent wear features of the pad. There was no unusual pad wear, no cracks, and no undue scoring or undue material degradation.

Test III was attempted with brake pads made from Sample 4 (without PBI). The test had to be aborted when a piece of the friction material broke off the metal backing plate. After removal of the pads, it was found that the high temperatures caused severe oxidation throughout the linings, evidenced by severe glaze, cracking, and delamination between the friction material and its host metal plate.

The standard SAE J661a tests and the road tests both demonstrate that the universal core group of fibers in an engineered mix results in a unique friction material with improved friction, improved wear, and unique char strength.

In the preferred embodiments, polybenzimidazole (PBI) serves as a critical element in preventing material decomposition at high temperatures.

There is thus provided a unique and effective core group of fibers to be used in the engineering of friction materials for an improved result in all applications.

Although specific terms have been used in describing the invention, they have been used in a generic and descriptive sense only and not for the purpose of limitation.

I claim:

1. An asbestos-free, friction material comprising, as a core group of asbestos-replacement fibers, 2–20 wt. % of polybenzimidazole fibers, 1–10 wt. % of aramid fibers, 1–18 wt. % of carbon fibers, and 5–15 wt. % of ceramic fibers.

2. The friction material of claim 1, comprising 10 wt. % of polybenzimidazole fibers.

3. The friction material of claim 1, comprising 3 wt. % aramid fibers.

4. The friction material of claim 1, comprising 18 wt. % of carbon fibers.

5. The friction material of claim 1, comprising 10 wt. % of ceramic fibers.

6. The friction material of claim 1, comprising 10 wt. % of polybenzimidazole fibers, 3 wt. % of aramid fibers, 18 wt. % of carbon fibers, and 10 wt. % of ceramic fibers.

* * * * *